(12) United States Patent
Luo

(10) Patent No.: US 6,291,591 B1
(45) Date of Patent: Sep. 18, 2001

(54) PROCESS FOR PRODUCING BLENDS OF SYNDIOTACTIC 1,2-POLYBUTADIENE AND RUBBERY ELASTOMERS WITH A CHROMIUM-BASED CATALYST SYSTEM

(75) Inventor: Steven Luo, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/548,181

(22) Filed: Apr. 13, 2000

(51) Int. Cl.[7] .............................. C08F 8/00; C08L 27/04; C08L 33/02; C08L 33/14; C08L 41/00

(52) U.S. Cl. ..................... 525/191; 525/212; 525/213; 525/221; 525/222; 525/227; 525/232; 525/240; 525/241

(58) Field of Search ..................................... 525/191, 212, 525/213, 221, 222, 223, 227, 232, 240, 241

(56) References Cited

U.S. PATENT DOCUMENTS

| | | |
|---|---|---|
| 3,418,505 | 12/1968 | Marsico . |
| 3,457,186 | 7/1969 | Marsico . |
| 3,498,963 | 3/1970 | Ichikawa et al. . |
| 3,725,373 | 4/1973 | Yoo . |
| 3,778,424 | 12/1973 | Sugiura et al. . |
| 3,957,894 | 5/1976 | Saeki et al. . |
| 4,048,418 | 9/1977 | Throckmorton ...................... 526/138 |
| 4,148,983 | 4/1979 | Throckmorton ...................... 526/139 |
| 4,168,357 | 9/1979 | Throckmorton et al. ............ 526/139 |
| 4,168,374 | 9/1979 | Throckmorton et al. ............ 526/139 |
| 4,182,813 | 1/1980 | Makino et al. ........................ 526/92 |
| 4,379,889 | 4/1983 | Ashitaka et al. ..................... 525/247 |
| 4,751,275 | 6/1988 | Witte et al. ........................... 526/139 |
| 4,912,182 | 3/1990 | Castner et al. ....................... 526/142 |
| 5,239,023 | 8/1993 | Hsu et al. ............................. 526/141 |
| 5,283,294 | 2/1994 | Hsu et al. ............................. 525/247 |
| 5,356,997 | 10/1994 | Massie, II et al. .................. 525/237 |
| 5,677,405 | 10/1997 | Goodall et al. ...................... 526/281 |
| 5,891,963 | 4/1999 | Brookhart et al. ................. 525/326.1 |
| 5,919,875 | 7/1999 | Luo et al. ............................. 526/139 |

FOREIGN PATENT DOCUMENTS

| | | |
|---|---|---|
| 45011154 | 12/1970 | (JP) . |
| 48006939 | 3/1973 | (JP) . |
| 48064178 | 9/1973 | (JP) . |
| 50154389 | 12/1975 | (JP) . |

OTHER PUBLICATIONS

Syndiotactic 1,2–Polybutadiene with Co–$CS_2$ Catalyst System I. Preparation Properties and Application of Highly Crystalline Syndiotactic 1,2–Polybutadiene, *Journal of Polymer Science: Polymer Chemistry Edition*, by H. Ashitaka et al., vol. 21, pp. 1853–1860, (1983).

"Conjugated Diene Polymerization," *Comprehensive Polymer Science*, by L. Porri and A. Giarrusso, Pergamon Press, Oxford, vol. 4, pp. 53–108, (1989).

U.S. Patent application Ser. No. 09/088,611, filed on Jun. 1, 1998.

U.S. Patent application Ser. No. 09/475,723, filed on Dec. 30, 1999.

U.S. Patent application Ser. No. 09/548,554, filed on Apr. 13, 2000.

U.S. Patent application Ser. No. 09/548,555, filed on Apr. 13, 2000.

*Primary Examiner*—Nathan M. Nutter
(74) *Attorney, Agent, or Firm*—David G. Burleson; Arthur M. Reginelli

(57) ABSTRACT

Blends of syndiotactic 1,2-polybutadiene and rubbery elastomers are prepared by a process that comprises polymerizing 1,3-butadiene monomer into syndiotactic 1,2-polybutadiene within a rubber cement of at least one rubbery elastomer by using a chromium-based catalyst composition that is formed by combining a chromium-containing compound, a hydrogen phosphite, and an organomagnesium compound.

20 Claims, No Drawings

PROCESS FOR PRODUCING BLENDS OF SYNDIOTACTIC 1,2-POLYBUTADIENE AND RUBBERY ELASTOMERS WITH A CHROMIUM-BASED CATALYST SYSTEM

FIELD OF THE INVENTION

The present invention is directed toward a process for producing blends of syndiotactic 1,2-polybutadiene and rubbery elastomers. More particularly, the process of this invention comprises polymerizing 1,3-butadiene into syndiotactic 1,2-polybutadiene within a rubber cement by using a chromium-based catalyst composition that is formed by combining a chromium-containing compound, a hydrogen phosphite, and an organomagnesium compound.

BACKGROUND OF THE INVENTION

Syndiotactic 1,2-polybutadiene is a crystalline thermoplastic resin that has a stereoregular structure in which the side-chain vinyl groups are located alternately on the opposite sides in relation to the polymeric main chain. Syndiotactic 1,2-polybutadiene is a unique material that exhibits the properties of both plastics and rubber, and therefore it has many uses. For example, films, fibers, and various molded articles can be made by utilizing syndiotactic 1,2-polybutadiene. It can also be blended into and co-cured with natural and synthetic rubbers.

Syndiotactic 1,2-polybutadiene can be made by solution, emulsion, or suspension polymerization. Generally, syndiotactic 1,2-polybutadiene has a melting temperature within the range of about 195° C. to about 215° C., but due to processability considerations, it is generally desirable for syndiotactic 1,2-polybutadiene to have a melting temperature of less than about 195° C.

Because syndiotactic 1,2-polybutadiene is insoluble in common solvents at normal polymerization temperatures, a common technical difficulty in the synthesis of syndiotactic 1,2-polybutadiene is that the polymerization mixture is an extremely thick slurry at the commercially desirable polymer concentration off 10% to 25% by weight. This thick slurry becomes difficult to stir and transfer, thereby diminishing heat transfer efficiency and interfering with proper process control. Also, the slurry contributes to reactor fouling due to the undesirable build-up of insoluble polymer on the baffles, agitator blades, agitator shafts, and walls of the polymerization reactor. It is therefore necessary to clean the reactor on a regular basis, which results in frequent shut-downs of continuous processes and serious limitations of the run length of batch processes. The task of cleaning the fouled reactor is generally difficult and time-consuming. All of these drawbacks detrimentally affect productivity and the cost of operation. It would be advantageous to develop a method of synthesizing syndiotactic 1,2-polybutadiene that avoids this frequent reactor fouling problem.

Various transition metal catalyst systems based on cobalt, titanium, vanadium, chromium, and molybdenum for the preparation of syndiotactic 1,2-polybutadiene have been reported. The majority of these catalyst systems, however, have no practical utility because they have low catalytic activity or poor stereo selectivity, and in some cases they produce low molecular weight polymers or partially crosslinked polymers unsuitable for commercial use.

The following two cobalt-based catalyst systems are well known for the preparation of syndiotactic 1,2-polybutadiene on a commercial scale: (1) a catalyst system containing cobalt bis(acetylacetonate), triethylaluminum, water, and triphenylphosphine (U.S. Pat. Nos. 3,498,963 and 4,182,813), and (2) a catalyst system containing cobalt tris (acetylacetonate), triethylaluminum, and carbon disulfide (U.S. Pat. No. 3,778,424). These cobalt-based catalyst systems also have serious disadvantages.

The first cobalt catalyst system referenced above yields syndiotactic 1,2-polybutadiene having very low crystallinity. Also, this catalyst system develops sufficient catalytic activity only when halogenated hydrocarbon solvents are used as the polymerization medium, and halogenated solvents present toxicity problems.

The second cobalt catalyst system referenced above uses carbon disulfide as one of the catalyst components. Because of its low flash point, obnoxious smell, high volatility, and toxicity, carbon disulfide is difficult and dangerous to use, and requires expensive safety measures to prevent even minimal amounts escaping into the atmosphere. Furthermore, the syndiotactic 1,2-polybutadiene produced with this cobalt catalyst system has a very high melting temperature of about 200–210° C., which makes it difficult to process the polymer. Although the melting; temperature of the syndiotactic 1,2-polybutadiene produced with this cobalt catalyst system can be reduced by employing a catalyst modifier as a fourth catalyst component, the presence of this catalyst modifier has adverse effects on the catalyst activity and polymer yields. Accordingly, many restrictions are required for the industrial utilization of these cobalt-based catalyst systems.

It is well known that the physical properties of rubbery elastomers can be improved by blending crystalline polymers therein. For example, incorporating syndiotactic 1,2-polybutadiene into rubber compositions that are utilized in the supporting carcass of tires greatly improves the green strength of those compositions. Also, incorporating syndiotactic 1,2-polybutadiene into tire tread compositions can reduce the heat build-up and improve the wear characteristics of tires. The green strength of synthetic rubbers such as cis-1,4-polybutadiene can also be improved by incorporating a small amount of syndiotactic 1,2-polybutadiene.

Blends of crystalline polymers and rubbery elastomers are typically prepared by standard mixing techniques. For example, these blends can be prepared by mixing or kneading and heat-treating a crystalline polymer and a rubbery elastomer by utilizing generally known mixing equipment such as a Banbury mixer, a Brabender mixer, an extruder, a kneader, or a mill mixer. These high-temperature mixing procedures, however, have certain drawbacks including high processing costs, polymer degradation and crosslinking, inadequate mixing, as well as various process limitations. Due to the high vinyl content of syndiotactic 1,2-polybutadiene, polymer degradation and crosslinking is a particularly severe problem for mixing syndiotactic 1,2-polybutadiene with elastomers at high temperatures.

Attempts to polymerize 1,3-butadiene into syndiotactic 1,2-polybutadiene within a rubber cement have been hampered by the same catalyst inefficiencies and toxicities mentioned above. For example, U.S. Pat. No. 4,379,889 teaches polymerizing 1,3-butadiene into syndiotactic 1,2-polybutadiene within a rubber cement by using a catalyst system comprising a cobalt compound, a dialkylaluminum halide, carbon disulfide, and an electron donative compound. And, U.S. Pat. No. 5,283,294 teaches a similar process that employs a catalyst system comprising a cobalt compound, an organoaluminum compound, and carbon disulfide. These methods, however, are inferior because the catalyst systems that are employed suffer from the foregoing disadvantages.

Therefore, it would be advantageous to develop a new and significantly improved process for producing blends of syndiotactic 1,2-polybutadiene and rubbery elastomers.

SUMMARY OF THE INVENTION

In general, the present invention provides a process for preparing blends of syndiotactic 1,2-polybutadiene and rubbery elastomers, the process comprising the steps of (1) providing a mixture of a rubber cement and 1,3-butadiene monomer, and (2) polymerizing the 1,3-butadiene monomer into syndiotactic 1,2-polybutadiene within the rubber cement by using a catalyst composition that is the combination of or the reaction product of ingredients comprising a chromium-containing compound, a hydrogen phosphite, and an organomagnesium compound.

The present invention further provides a process for producing blends of syndiotactic 1,2-polybutadiene and rubbery elastomers, the process comprising the steps of (1) providing a mixture of a rubber cement and 1,3-butadiene monomer, and (2) polymerizing the 1,3-butadiene monomer into syndiotactic 1,2-polybutadiene within the rubber cement by using a catalyst composition that is formed by combining a chromium-containing compound, a hydrogen phosphite, and an organomagnesium compound.

The present invention also provides a blend of syndiotactic 1,2-polybutadiene and rubbery elastomers prepared by a process comprising the steps of (1) providing a mixture of a rubber cement and 1,3-butadiene monomer, and (2) polymerizing the 1,3-butadiene monomer into syndiotactic 1,2-polybutadiene within the rubber cement by using a catalyst composition that is the combination of or the reaction product of ingredients comprising a chromium-containing compound, a hydrogen phosphite, and an organomagnesium compound.

Advantageously, the process of this invention directly provides blends of syndiotactic 1,2-polybutadiene and rubbery elastomers by synthesizing syndiotactic 1,2-polybutadiene within a rubber cement and thereby obviates the need for high-temperature mixing. Also, good dispersion of syndiotactic 1,2-polybutadiene throughout rubbery elastomers can be easily and economically achieved. Significantly, the process of this invention eliminates the problems of high processing costs, polymer degradation and crosslinking, inadequate mixing, and various process limitations that are associated with high-temperature mixing procedures. The process of this invention also alleviates the problems of polymer cement thickness and reactor fouling that are associated with the synthesis of syndiotactic 1,2-polybutadiene in the absence of a rubbery elastomer.

In addition, the chromium-based catalyst system employed in this invention has very high catalytic activity and stereoselectivity for the syndiospecific polymerization of 1,3-butadiene. This activity and selectivity, among other advantages, allows syndiotactic 1,2-polybutadiene to be produced in very high yields within a rubber cement. Additionally, this catalyst composition does not contain carbon disulfide, and therefore the toxicity, objectionable smell, dangers, and expense associated with the use of carbon disulfide are eliminated. Further, this catalyst composition is chromium-based, and chromium compounds are generally stable, inexpensive, relatively innocuous, and readily available. Furthermore, this catalyst composition has high catalytic activity in a wide variety of solvents including the environmentally-preferred nonhalogenated solvents such as aliphatic and cycloaliphatic hydrocarbons.

DETAILED DESCRIPTION OF ILLUSTRATIVE EMBODIMENTS

The present invention is generally directed toward a process for producing blends of syndiotactic 1,2-polybutadiene and rubbery elastomers It has now been found that blends of syndiotactic 1,2-polybutadiene and rubbery elastomers can be directly produced by polymerizing 1,3-butadiene monomer into syndiotactic 1,2-polybutadiene within a rubber cement by using a chromium-based catalyst composition.

According to the process of the present invention, blends of syndiotactic 1,2-polybutadiene and rubbery elastomers are produced by the steps of: (1) providing a mixture of a rubber cement and 1,3-butadiene monomer, where the rubber cement includes at least one rubbery elastomer within an organic solvent and (2) polymerizing the 1,3-butadiene monomer into syndiotactic 1,2-polybutadiene within the rubber cement by using an chromium-based catalyst composition. The chromium-based catalyst composition employed to synthesize the syndiotactic 1,2-polybutadiene comprises (a) a chromium-containing compound, (b) a hydrogen phosphite, and (c) an organomagnesium compound.

Although the preferred embodiment of the present invention is directed toward the polymerization of 1,3-butadiene into syndiotactic 1,2-polybutadiene within a rubber cement, other conjugated diene monomers can be polymerized by using the chromium-based catalyst composition to form conjugated diene polymers, preferably crystalline polymers, within a rubber cement.

The rubber cement employed in this invention is a solution, preferably viscous, of at least one rubbery elastomer in an organic solvent. Virtually any type of rubbery elastomer can be used to prepare the rubber cement. Some specific examples of suitable rubbery elastomers include, but are not limited to, natural rubber, low-vinyl polybutadiene, cis-1,4-polybutadiene, amorphous 1,2-polybutadiene, low-vinyl polyisoprene, cis-1,4-polyisoprene, polyisobutylene, neoprene, ethylene-propylene copolymer rubber (EPR), styrene-butadiene rubber (SBR), styrene-isoprene rubber (SIR), styrene-isoprene-butadiene rubber (SIBR), styrene-butadiene-styrene block copolymer (SBS), styrene-butadiene block copolymer (SB), hydrogenated styrene-butadiene-styrene block copolymer (SEBS), hydrogenated styrene-butadiene block copolymer (SEB), styrene-isoprene-styrene block copolymer (SIS), styrene-isoprene block copolymer (SI), hydrogenated styrene-isoprene-styrene block copolymer (SEPS), hydrogenated styrene-isoprene block copolymer (SEP), polysulfide rubber, acrylic rubber, urethane rubber, silicone rubber, epichlorohydrin rubber, and the like. Mixtures of the above rubbery elastomers may also be used. These rubbery elastomers are well known and, for the most part, are commercially available. Also, those skilled in the art will be able to readily synthesize these rubbery elastomers by using techniques that are well known in the art.

The rubber cement can be prepared by dissolving the above-mentioned rubbery elastomers in an organic solvent. When commercially available rubbery elastomers are employed to prepare the rubber cement, it may be necessary to purify the commercial products before use in order to remove residual water and additives that may become catalyst poisons in the subsequent step of polymerizing 1,3-butadiene monomer into syndiotactic 1,2-polybutadiene within the rubber cement.

In a preferred embodiment, the rubber cement is prepared in situ by polymerizing one or more appropriate monomers into rubbery elastomers in an organic solvent within the same reactor that is subsequently used for polymerizing 1,3-butadiene into syndiotactic 1,2-polybutadiene. As noted above, many methods of synthesizing the above-mentioned rubbery elastomers are well known in the art. Preferably, however, the catalyst utilized in preparing the rubbery elastomers should not contain any ingredients that may interfere with the catalyst subsequently used in the step of polymerizing 1,3-butadiene monomer into syndiotactic 1,2-polybutadiene within the rubber cement.

Coordination catalyst systems, which are well known in the art, can be used for preparing the rubber cement of rubbery elastomers in situ. For example, lanthanide-based catalyst systems comprising a lanthanide compound such as a neodymium compound, an alkylating agent, and a source of halogen are described in U.S. Pat. Nos. 3,297,667, 3,541,063, 3,794,604, which are incorporated herein by reference. These lanthanide-based catalyst systems are particularly useful for polymerizing 1,3-butadiene monomer into cis-1,4-polybutadiene rubber. When a coordination catalyst such as the lanthanide-based system is used to synthesize rubbery elastomers, the catalyst is preferably inactivated by adding a terminator prior to proceeding with the synthesis of syndiotactic 1,2-polybutadiene within the rubber cement. Suitable terminators include, but are not limited to, alcohols, carboxylic acids, inorganic acids, water, and mixtures thereof. It is not always necessary, however, to add a terminator to inactivate the catalyst system used to synthesize the rubbery elastomers since it is believed that the catalyst may be inactivated by the hydrogen phosphite component of the chromium-based catalysts composition that is subsequently used to synthesize the syndiotactic 1,2-polybutadiene. This has been found to be true in the case where a coordination catalyst that includes a neodymium compound, an alkylating agent, and a source of halogen ion is used to synthesize the rubbery elastomers.

Also, anionic polymerization initiators, which are well known in the art, can be used for preparing the rubber cement of rubbery elastomers in situ. These initiators include, but are not limited to, organolithium initiators such as butyllithium or functional initiators such as lithium amide initiators, aminoalkyl lithium initiators, and organotin lithium initiators. Exemplary initiators are described in U.S. Pat. Nos. 5,153,159, 5,268,439, 5,274,106, 5,238,893, 5,332,810, 5,329,005, 5,578,542, 5,393,721, 5,491,230, 5,521,309, 5,496,940, 5,574,109, 5,523,364, 5,527,753, and 5,550,203. These initiators are particularly useful for synthesizing conjugated diene elastomers or copolymers of conjugated diene monomers and vinyl-substituted aromatic monomers. When an anionic initiator is used to prepare the rubbery elastomers, it is preferred to quench the polymerization by adding a terminator prior to proceeding with the synthesis of syndiotactic 1,2-polybutadiene within the rubber cement. Suitable terminators include, but are not limited to, metal halides, organic halides, alcohols, carboxylic acids, inorganic acids, sulfonic acid, water, and mixtures thereof. Metal halides, such as diethylaluminum chloride and ethylaluminum dichloride, are preferred, as are organic halides such as trimethylsilylchloride. Failure to quench the anionic polymerization may interfere with the formation of syndiotactic 1,2-polybutadiene.

Other methods that are useful for synthesizing rubbery elastomers are known in the art, and the practice of this invention should not be limited to the selection of any particular elastomer, or to any particular method for synthesizing rubbery elastomers.

Suitable monomers that can be polymerized to form the rubbery elastomers include conjugated diene monomers. Vinyl-substituted aromatic monomers can be copolymerized with one or more conjugated diene monomers to form rubbery elastomers. Some specific examples of suitable conjugated diene monomers that can be polymerized into rubbery elastomers include 1,3-butadiene, 2,3-dimethyl-1,3-butadiene, 2-phenyl-1,3-butadiene, 2-ethyl-1,3-butadiene, isoprene, 1,3-pentadiene, 2-methyl-1,3-pentadiene, 2,3-dimethyl-1,3-pentadiene, 3-methyl-1,3-pentadiene, 4methyl-1,3-pentadiene, 1,3-hexadiene, 2,4-hexadiene, and 4,5-diethyl-1,3-octadiene. Some specific examples of suitable vinyl-substituted aromatic monomers that can be polymerized into rubbery elastomers include styrene, 4-methylstyrene, α-methylstyrene, 3,5-diethylstyrene, 4-ethylstyrene, 4-propylstyrene, 3,5-diethylstyrene, 2,4,6-trimethylstyrene, 4-dodecylstyrene, 2,3,4,5-tetraethylstyrene, 3-methyl-5-normal-hexylstyrene, 4-phenylstyrene, 2-ethyl-4-benzylstyrene, 3,5-diphenylstyrene, 1-vinylnaphthalene, 3-ethyl-1-vinylnaphthalene, 6-isopropyl-1-vinylnaphthalene, 6-cyclohexyl-1-vinylnapthalene, 7-dodecyl-2-vinylnaphthalene, and the like, and mixtures thereof.

In preparing the rubber cement, it is normally desirable to select an organic solvent that is inert with respect to the catalyst systems that will be employed to synthesize the rubbery elastomers and the syndiotactic 1,2-polybutadiene. Suitable types of organic solvents that can be utilized in preparing the rubber cement include, but are not limited to, aliphatic, cycloaliphatic, and aromatic hydrocarbons. Some representative examples of suitable aliphatic solvents include n-pentane, n-hexane, n-heptane, n-octane, n-nonane, n-decane, isopentane, isohexanes, isoheptanes, isooctanes, 2,2-dimethylbutane, petroleum ether, kerosene, petroleum spirits, and the like. Some representative examples of suitable cycloaliphatic solvents include cyclopentane, cyclohexane, methylcyclopentane, methylcyclohexane, and the like. Some representative examples of suitable aromatic solvents include benzene, toluene, xylenes, ethylbenzene, diethylbenzene, mesitylene, and the like. Commercial mixtures of the above hydrocarbons may also be used. For environmental reasons, aliphatic and cycloaliphatic solvents are highly preferred.

The concentration of the rubbery elastomers in the rubber cement varies depending on the types of the rubbery elastomers and organic solvent employed. It is generally preferred that the concentration of the rubbery elastomers be in a range of from about 5% to about 35% by weight of the rubber cement, more preferably from about 10% to 30% by weight of the rubber cement, and even more preferably from about 15% to about 25% by weight of the rubber cement.

The foregoing rubber cement is then utilized as a polymerization medium for the stereospecific polymerization of 1,3-butadiene monomer into syndiotactic 1,2-polybutadiene. Thus, 1,3-butadiene monomer, a chromium-based catalyst composition, and optionally additional organic solvent are added to the rubber cement. The order in which the 1,3-butadiene monomer, the chromium-based catalyst composition, and the solvent are added to the rubber cement does not limit the scope of the invention, although it may be preferable to add the chromium-based catalyst composition, or at least an ingredient thereof, prior to the addition of the 1,3-butadiene monomer.

The amount of 1,3-butadiene monomer added to the rubber cement is contingent upon the proportion of syndiotactic 1,2-polybutadiene desired in the resultant polymer blend. The additional organic solvent can be selected from the group of the organic solvents mentioned above for the preparation of the rubber cement, and may be the same as or different from the organic solvent used in preparing the rubber cement. It should be noted that the addition of 1,3-butadiene monomer to the rubber cement may not be required in the case where 1,3-butadiene monomer is employed to prepare the rubbery elastomers and the polymerization is stopped before all the 1,3-butadiene is consumed, thereby providing the remaining 1,3-butadiene monomer for synthesizing the syndiotactic 1,2-polybutadiene without the need to add additional 1,3-butadiene monomer.

Chromium-based catalyst compositions useful for the polymerization of 1,3-butadiene into syndiotactic 1,2-polybutadiene are described in co-pending patent applications U.S. Pat. Nos. 6,201,080 and 6,117,956, which are incorporated in their entirety herein by reference. Generally, the preferred catalyst composition is formed by combining (a) a chromium-containing compound, (b) a hydrogen phosphite, and (c) an organomagnesium compound. In addition to the three catalyst ingredients (a), (b), and (c), other organometallic compounds or Lewis bases that are known in the art can also be added, if desired.

Various chromium-containing compounds or mixtures thereof can be employed as ingredient (a) of the chromium-based catalyst composition utilized in this invention. It is generally advantageous to employ chromium-containing compounds that are soluble in a hydrocarbon solvent such as aromatic hydrocarbons, aliphatic hydrocarbons, or cycloaliphatic hydrocarbons. Hydrocarbon-insoluble chromium-containing compounds, however, can be suspended in the polymerization medium to form the catalytically active species and are therefore also useful.

The chromium atom in the chromium-containing compounds can be in various oxidation states ranging from 0 up to +6. It is preferable to use divalent chromium compounds (also called chromous compounds), wherein the chromium is in the +2 oxidation state, and trivalent chromium compounds (also called chromic compounds), wherein the chromium is in the +3 oxidation state. Suitable types of chromium-containing compounds that can be utilized include, but are not limited to, chromium carboxylates, chromium organophosphates, chromium organophosphonates, chromium organophosphinates, chromium carbamates, chromium dithiocarbamates, chromium xanthates, chromium β-diketonates, chromium alkoxides or aryloxides, chromium halides, chromium pseudo-halides, chromium oxyhalides, and organochromium compounds.

Some specific examples of suitable chromium carboxylates include chromium formate, chromium acetate, chromium acrylate, chromiam methacrylate, chromium valerate, chromium gluconate, chromium citrate, chromium fumarate, chromium lactate, chromium maleate, chromium oxalate, chromium 2-ethylhexanoate, chromium neodecanoate, chromium naphthenate, chromium stearate, chromium oleate, chromium benzoate, and chromium picolinate.

Some specific examples of suitable chromium organophosphates include chromium dibutyl phosphate, chromium dipentyl phosphate, chromium dihexyl phosphate, chromium diheptyl phosphate, chromium dioctyl phosphate, chromium bis(1-methylheptyl) phosphate, chromium bis (2-ethylhexyl) phosphate, chromium didecyl phosphate, chromium didodecyl phosphate, chromium dioctadecyl phosphate, chromium dioleyl phosphate, chromium diphenyl phosphate, chromium bis(p-nonylphenyl) phosphate, chromium butyl (2-ethylhexyl) phosphate, chromium (1-methylheptyl) (2-ethylhexyl) phosphate, and chromium (2-ethylhexyl) (p-nonylphenyl) phosphate.

Some specific examples of suitable chromium organophosphonate; include chromium butyl phosphonate, chromium pentyl phosphonate, chromium hexyl phosphonate, chromium heptyl phosphonate, chromium octyl phosphonate, chromium (1-methylheptyl) phosphonate, chromium (2-ethylhexyl) phosphonate, chromium decyl phosphonate, chromium dodecyl phosphonate, chromium octadecyl phosphonate, chromium oleyl phosphonate, chromium phenl phosphonate, chromium (p-nonylphenyl) phosphonate, chromium butyl butylphosphonate, chromium pentyl pentylphosphonate, chromium hexyl hexylphosphonate, chromium heptyl heptylphosphonate, chromium octyl octylphosphonate, chromium (1-methylheptyl) (1-methylheptyl)phosphonate, chromium (2-ethylhexyl) (2-ethylhexyl)phosphonate, chromium decyl decylphosphonate, chromium dodecyl dodecylphosphonate, chromium octadecyl octadecylphosphonate, chromium oleyl oleylphosphonate, chromium phenyl phenylphosphonate, chromium (p-nonylphenyl) (p-nonylphenyl)phosphonate, chromium butyl (2-ethylhexyl)phosphonate, chromium (2-ethylhexy) butylphosphonate, chromium (1-methylheptyl) (2-ethylhexyl)phosphonate, chromium (2-ethylhexyl) (1-methylheptyl)phosphonate, chromium (2-ethylhexyl) (p-nonylphenyl)phosphonate, and chromium (p-nonylphenyl) (2-ethylhexyl)phosphonate.

Some specific examples of suitable chromium organophosphinates include chromium butylphosphinate, chromium pentylphosphinate, chromium hexylphosphinate, chromium heptylphosphinate, chromium octylphosphinate, chromium (1-methylheptyl)phosphinate, chromium (2-ethylhexyl)phosphinate, chromium decylphosphinate, chromium dodecylphosphinate, chromium octadecylphosphinate, chromium oleylphosphinate, chromium phenylphosphinate, chromium (p-nonylphenyl) phosphinate, chromium dibutylphosphinate, chromium dipentylphosphinate, chromium dihexylphosphinate, chromium diheptylphosphinate, chromium dioctylphosphinate, chromium bis(1-methylheptyl)phosphinate, chromium bis (2-ethylhexyl)phosphinate, chromium didecylphosphinate, chromium didodecylphosphinate, chromium dioctadecylphosphinate, chromium dioleylphosphinate, chromium diphenylphosphinate, chromium bis(p-nonylphenyl)phosphinate, chromium butyl(2-ethylhexyl) phosphinate, chromium (1-methylheptyl) (2-ethylhexyl) phosphinate, and chromium (2-ethylhexyl) (p-nonylphenyl) phosphinate.

Some specific examples of suitable chromium carbamates include chromium dimethylcarbamate, chromium diethylcarbamate, chromium diisopropylcarbamate, chromium dibutylcarbamate, and chromium dibenzylcarbamate.

Some specific examples of suitable chromium dithiocarbamates include chromium dimethyldithiocarbamate, chromium diethyldithiocarbamate, chromium diisopropyldithiocarbamate, chromium dibutyldithiocarbamate, and chromium dibenzyldithiocarbamate.

Some specific examples of suitable chromium xanthates include chromium methylxanthate, chromium ethylxanthate, chromium isopropylxanthate, chromium butylxanthate, and chromium benzylxanthate.

Some specific examples of suitable chromium β-diketonates include chromium acetylacetonate, chromium trifluroacetylacetonate, chromium hexafluoroacetylacetonate, chromium benzoylacetonate, chromium 2,2,6,6-tetramethyl-3,5-heptanedionate, chromium dioxide bis(acetylacetonaite), chromium dioxide bis (trifluoroacetylacetonate), chromium dioxide bis (hexafluoroacetylacetonate), chromium dioxide bis (benzoylacetonate), and chromium dioxide bis(2,2,6,6-tetramethyl-3,5-heptanedionate).

Some specific examples of suitable chromium alkoxides or aryloxides include chromium methoxide, chromium ethoxide, chromium isopropoxide, chromium 2-ethylhexoxide, chromium phenoxide, chromium nonylphenoxide, and chromium naphthoxide.

Some specific examples of suitable chromium halides include chromium hexafluoride, chromium pentafluoride, chromium tetrafluoride, chromium trifluoride, chromium pentachloride, chromium tetrachloride, chromium trichloride, chromium tetrabromide, chromium tribromide, chromium triiodide, and chromium diiodide.

Some specific examples of suitable chromium pseudo-halides include chromium cyanide, chromium cyanate, chromium thiocyanate, and chromium azide.

Some specific examples of suitable chromium oxyhalides include chromium oxytetrafluoride, chromium dioxydifluoride, chromium oxytetrachloride:, chromium oxytrichloride, chromium dioxydichloride, chromium oxytribromide, and chromium dioxydibromide.

The term "organochromium compound" refers to any chromium compound containing at least one chromium-carbon bond. Some specific examples of suitable organochromium compounds include tris(allyl)chromium, tris(methallyl)chromium, tris(crotyl)chromium, bis(cyclopentadienyl)chromium (also called chromocene), bis(pentamethylcyclopentadienyl)chromium, bis(ethylbenzene)chromium (also called decamethylchromocene), bis(benzene)chromium, bis(ethylbenzene)chromium, bis(mesitylene)chromium, bis(pentadienyl)chromium, bis(2,4-dimethylpentadienyl)chromium, bis(allyl)tricarbonylchromium, (cyclopentadienyl)(pentadienyl)chromium, tetra(1-norbornyl)chromium (trimethylenemethane)tetracarbonylchromium, bis(butadiene)dicarbonylchromium, (butadiene)tetracarbonylchromium, and bis(cyclooctatetraene)chromium.

Useful hydrogen phosphite compounds that can be employed as ingredient (b) of the chromium-based catalyst composition utilized in this invention are either acyclic hydrogen phosphites, cyclic hydrogen phosphites, or mixtures thereof.

In general, acyclic hydrogen phosphites may be represented by the following keto-enol tautomeric structures:

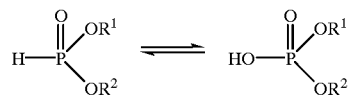

where $R^1$ and $R^2$, which may be the same or different, are mono-valent organic groups. Preferably, $R^1$ and $R^2$ are hydrocarbyl groups such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to 20 carbon atoms. These hydrocarbyl groups may contain heteroatoms such as, but not limited to, nitrogen, oxygen, silicon, sulfur, and phosphorus atoms. The acyclic hydrogen phosphites exist mainly as the keto tautomer (shown on the left), with the enol tautomer (shown on the right) being the minor species. The equilibrium constant for the above-mentioned tautomeric equilibrium is dependent upon factors such as the temperature, the types of $R^1$ and $R^2$ groups, the type of solvent, and the like. Both tautomers may be associated in dimeric, trimeric or oligomeric forms by hydrogen bonding. Either of the two tautomers or mixtures thereof can be employed as the ingredient (b) of the chromium-based catalyst composition utilized in this invention.

Some representative and non-limiting examples of suitable acyclic hydrogen phosphites are dimethyl hydrogen phosphite, diethyl hydrogen phosphite, dibutyl hydrogen phosphite, dihexyl hydrogen phosphite, dioctyl hydrogen phosphite, didecyl hydrogen phosphite, didodecyl hydrogen phosphite, dioctadecyl hydrogen phosphite, bis(2,2,2-trifluoroethyl) hydrogen phosphite, diisopropyl hydrogen phosphite, bis(3,3-dimethyl-2-butyl) hydrogen phosphite, bis(2,4-dimethyl-3-pentyl) hydrogen phosphite, di-t-butyl hydrogen phosphite, bis(2-ethylhexyl) hydrogen phosphite, dineopentyl hydrogen phosphate, bis(cyclopropylmethyl) hydrogen phosphite, bis(cyclobutylmethyl) hydrogen phosphite, bis(cyclopentylmethyl) hydrogen phosphite, bis(cyclohexylmethyl) hydrogen phosphite, dicyclobutyl hydrogen phosphite, dicyclopentyl hydrogen phosphite, dicyclohexyl hydrogen phosphite, dimethyl hydrogen phosphite, diphenyl hydrogen phosphite, dinaphthyl hydrogen phosphite, dibenzyl hydrogen phosphite, bis(1-naphthylmethyl)hydrogen phosphite, diallyl hydrogen phosphite, dimethallyl hydrogen phosphite, dicrotyl hydrogen phosphite, ethyl butyl hydrogen phosphite, methyl hexyl hydrogen phosphite, methyl neopentyl hydrogen phosphite, methyl phenyl hydrogen phosphite, methyl cyclohexyl hydrogen phosphite, methyl benzyl hydrogen phosphite, and the like. Mixtures of the above dihydrocarbyl hydrogen phosphites may also be utilized.

In general, cyclic hydrogen phosphites contain a divalent organic group that bridges between the two oxygen atoms that are singly-bonded to the phosphorus atoms. These cyclic hydrogen phosphites may be represented by the following keto-enol tautomeric structures:

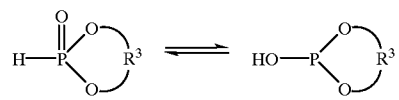

where $R^3$ is a divalent organic group. Preferably, $R^3$ is a hydrocarbylene group such as, but not limited to, alkylene, cycloalkylene, substituted alkylene, substituted cycloalkylene, alkenylene, cycloalkenylene, substituted alkenylene, substituted cycloalkenylene, arylene, and substituted arylene groups, with each group preferably containing from 1 carbon atom, or the appropriate minimum number of carbon atoms to form the group, up to 20 carbon atoms. These hydrocarbylene groups may contain heteroatoms such as, but not limited to, nitrogen, oxygen, silicon, sulfur, and phosphorus atoms. The cyclic hydrogen phosphites exist mainly as the keto tautomer (shown on the left), with the enol tautomer (shown on the right) being the minor species. The equilibrium constant for the above-mentioned tautomeric equilibrium is dependent upon factors such as the temperature, the types of $R^3$ group, the type of solvent, and the like. Both tautomers may be associated in dimeric, trimeric or oligomeric forms by hydrogen bonding. Either of the two tautomers or mixtures thereof can be employed as the ingredient (b) of the chromium-based catalyst composition utilized in this invention.

The cyclic hydrogen phosphites may be synthesized by the transesterification reaction of an acyclic dihydrocarbyl hydrogen phosphite (usually dimethyl hydrogen phosphite or diethyl hydrogen phosphite) with an alkylene diol or an arylene diol. Procedures for this transesterification reaction are well known to those skilled in the art. Typically, the transesterification reaction is carried out by heating a mixture of an acyclic dihydrocarbyl hydrogen phosphite and an alkylene diol or an arylene diol. Subsequent distillation of the side-product alcohol (usually methanol or ethanol) that results from the transesterification reaction leaves the new-made cyclic hydrogen phosphite.

Some specific examples of suitable cyclic alkylene hydrogen phosphites are 2-oxo-(2H)-5-butyl-5-ethyl-1,3,2-dioxaphosphorinane, 2-oxo-(2H)-5,5-dimethyl-1,3,2-dioxaphosphorinane, 2-oxo-(2H)-1,3,2-dioxaphosphorinane, 2-oxo-(2H)-4-methyl-1,3,2-dioxaphosphorinane, 2-oxo-(2H)-5-ethyl-5-methyl-1,3,2-dioxaphosphorinane, 2-oxo-(2H)-5,5-diethyl-1,3,2-dioxaphosphorinane, 2-oxo-(2H)-5-methyl-5-propyl-1,3,2-dioxaphosphorinane, 2-oxo-(2H)-4-isopropyl-5,5-dimethyl-1,3,2-dioxaphosphorinane, 2-oxo-(2H)-4,6-dimethyl-1,3,2-dioxaphosphorinane, 2-oxo-(2H)-4-propyl-5-ethyl-1,3,2-dioxaphosphorinane, 2-oxo-(2H)-4-methyl-1,3,2-dioxaphospholane, 2-oxo-(2H)-4,5-dimethyl-1,3,2-dioxaphospholane, 2-oxo-(2H)-4,4,5,5-tetramethyl-1,3,2-dioxaphospholane, and the like. Mixtures of the above cyclic alkylene hydrogen phosphites may also be utilized.

Some specific examples of suitable cyclic arylene hydrogen phosphites are 2-oxo-(2H)-4,5-benzo-1,3,2-dioxaphospholane, 2-oxo-(2H)-4,5-(3'-methylbenzo)-1,3,2-dioxaphospholane, 2-oxo-(2H)-4,5-(4'-methylbenzo)-1,3,2-dioxaphospholane, 2-oxo-(2H)-4,5-(4'-tert-butylbenzo)-1,3,2-dioxaphospholane, 2-oxo-(2H)-4,5-naphthalo-1,3,2-dioxaphospholane, and the like. Mixtures of the above cyclic arylene hydrogen phosphites may also be utilized.

The chromium-based catalyst composition utilized in this invention further comprises an organomagnesium compound, which has been designated as ingredient (c). As used herein, the term "organomagnesium compound" refers to any magnesium compound containing at least one magnesium-carbon bond. It is generally advantageous to employ organomagnesium compounds that are soluble in a hydrocarbon solvent.

A preferred class of organomagnesium compounds that can be utilized as ingredient (c) of the chromium-based catalyst composition utilized in this invention is represented by the general formula $MgR^4_2$, where each $R^4$, which may be the same or different, is a mono-valent organic group, with the proviso that the group is attached to the magnesium atom via a carbon atom. Preferably, each $R^4$ is a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atom.

Some specific examples of suitable dihydrocarbylmagnesium compounds that can be utilized include diethylmagnesium, di-n-propylmagnesiurn, diisopropylmagnesium, dibutylmagnesium, dihexylmagnesium, diphenylmagnesium, dibenzylmagnesium, and mixtures thereof. Dibutylmagnesium is particularly useful due to its availability and its solubility in aliphatic and cycloaliphatic hydrocarbon solvents.

Another class of organomagnesium compounds that can be utilized as ingredient (c) of the catalyst composition utilized in this invention is represented by the general formula $R^5MgX$, where $R^5$ is a mono-valent organic group, with the proviso that the group is attached to the magnesium atom via a carbon atom, amd X is a hydrogen atom, a halogen atom, a carboxylate group, an alkoxide group, or an aryloxide group. Preferably, $R^5$ is a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atoms. Preferably, X is a carboxylate group, an alkoxide group, or an aryloxide group, with each group preferably containing 1 to 20 carbon atoms.

Some suitable types of organomagnesium compounds that are represented by the general formula $R^5MgX$ include, but are not limited, hydrocarbylmagnesium hydride, hydrocarbylmagnesium halide, hydrocarbylmagnesium carboxylate, hydrocarbylmagnesium alkoxide, hydrocarbylmagnesium aryloxide, and mixtures thereof.

Some specific examples of suitable organomagnesium compounds that are represented by the general formula $R^5MgX$ include methylmagnesium hydride, methylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, benzylmagnesium phenoxide, and the like, and mixtures thereof.

The chromium-based catalyst composition utilized in this invention has very high catalytic activity for polymerizing 1,3-butadiene into syndiotactic 1,2-polybutadiene over a wide range of total catalyst concentrations and catalyst ingredient ratios. The polymers having the most desirable properties, however, are obtained within a narrower range of total catalyst concentrations and catalyst ingredient ratios. Further, it is believed that the three catalyst ingredients (a), (b), and (c) can interact to form an active catalyst species. Accordingly, the optimum concentration for any one catalyst ingredient is dependent upon the concentrations of the other catalyst ingredients. The molar ratio of the hydrogen phosphite to the chromium-containing compound (P/Cr) can be varied from about 0.5:1 to about 50:1, more preferably from about 1:1 to about 25:1, and even more preferably from about 2:1 to about 10:1. The molar ratio of the organomagnesium compound to the chromium-containing compound (Mg/Cr) can be varied from about 1:1 to about 50:1, more preferably from about 2:1 to about 30:1, and even more preferably from about 3:1 to about 20:1.

As discussed above, the chromium-based catalyst composition utilized in the present invention is preferably formed by combining the three catalyst ingredients (a), (b), and (c). Although an active catalyst species is believed to result from this combination, the degree of interaction or reaction between the various ingredients or components is not known with any great degree of certainty. Therefore, it should be understood that the term "catalyst composition" has been employed to encompass a simple mixture of the ingredients, a complex of the various ingredients that is caused by physical or chemical forces of attraction, a chemical reaction product of the ingredients, or a combination of the foregoing.

The chromium-based catalyst composition utilized in this invention can be formed by combining or mixing the catalyst ingredients or components by using, for example, one of the following methods:

First, the catalyst composition may be formed in situ by adding the three catalyst ingredients to the rubber cement containing the rubbery elastomer and 1,3-butadiene monomer in either a stepwise or simultaneous manner. When adding the catalyst ingredients in a stepwise manner, the sequence in which the ingredients are added is not critical. Preferably, however, the organomagnesium compound is added first, followed by the chromium-containing compound, and then followed by the hydrogen phosphite.

Second, the three catalyst ingredients may be pre-mixed outside the polymerization system at an appropriate temperature, which is generally from about $-20°$ C. to about $80°$ C., and the resulting catalyst composition is then added to the rubber cement containing the rubbery elastomer and 1,3-butadiene monomer.

Third, the catalyst composition may be pre-formed in the presence of 1,3-butadiene monomer. That is, the three catalyst ingredients are pre-mixed in the presence of a small amount of 1,3-butadiene monomer at an appropriate temperature, which is generally from about $-20°$ C. to about $80°$ C. The amount of 1,3-butadiene monomer that is used for the catalyst pre-forming can range from about 1 to about 500 moles per mole of the chromium-containing compound, more preferably from about 4 to about 100 moles per mole of the chromium-containing compound, and even more preferably from about 10 to about 50 moles per mole of the chromium-containing compound. The resulting catalyst composition is then added to the rubber cement containing the rubbery elastomer and the remainder of the 1,3-butadiene monomer that is to be polymerized.

Fourth, as a further variation, the catalyst composition can also be formed by using a two-stage procedure. The first stage involves combining the chromium-containing compound and the organomagnesium compound in the presence of a small amount of 1,3-butadiene monomer at an appropriate temperature, which is generally from about $-20°$ C. to about $80°$ C. In the second stage, the foregoing reaction mixture and the hydrogen phosphite are charged in either a stepwise or simultaneous manner to the rubber cement containing the rubbery elastomer and the remainder of the 1,3-butadiene monomer that is to be polymerized.

Fifth, an alternative two-stage procedure may also be employed. A chromium-ligand complex is first formed by pre-combining the chromium-containing compound and the hydrogen phosphite compound. Once formed, this chromium-ligand complex is then combined with the organomagnesium compound to form the active catalyst species. The chromium-ligand complex can be formed separately or in the rubber cement containing the rubbery elastomer and the 1,3-butadiene monomer that is to be polymerized. This complexation reaction can be conducted at any convenient temperature at normal pressure, but for an increased rate of reaction, it is preferred to perform this reaction at room temperature or above. The time required for the formation of the chromium-ligand complex is usually within the range of about 10 minutes to about 2 hours after mixing the chromium-containing compound with the hydrogen phosphite compound. The temperature and time used for the formation of the chromium-ligand complex will depend upon several variables including the particular starting materials and the solvent employed. Once formed, the chromium-ligand complex can be used without isolation from the complexation reaction mixture. If desired, however, the chromium-ligand complex may be isolated from the complexation reaction mixture before use.

Sixth, the three catalyst ingredients may be added to the rubber cement prior to or simultaneously with the addition of 1,3-butadiene monomer.

When a solution of the chromium-based catalyst composition or one or more of the catalyst ingredients is prepared outside the polymerization system as set forth in the foregoing methods, an organic solvent or carrier is preferably employed. Useful solvents include hydrocarbon solvents such as aromatic hydrocarbons, aliphatic hydrocarbons, and cycloaliphatic hydrocarbons. Non-limiting examples of aromatic hydrocarbon solvents include benzene, toluene, xylenes, ethylbenzene, diethylbenzene, mesitylene, and the like. Non-limiting examples of aliphatic hydrocarbon solvents include n-pentane, n-hexane, n-heptane, n-octane, n-nonane, n-decane, isopentane, isohexanes, isopentanes, isooctanes, 2,2-dimethylbutane, petroleum ether, kerosene, petroleum spirits, and the like. And, non-limiting examples of cycloaliphatic hydrocarbon solvents include cyclopentane, cyclohexane, methylcyclopentane, methylcyclohexane, and the like. Commercial mixtures of the above hydrocarbons may also be used. For environmental reasons, aliphatic and cycloaliphatic solvents are highly preferred. The foregoing organic solvents may serve to dissolve the catalyst composition or ingredients, or the solvent may simply serve as a carrier in which the catalyst composition or ingredients may be suspended.

The production of blends of syndiotactic 1,2-polybutadiene and rubbery elastomers according to this invention is accomplished by polymerizing 1,3-butadiene monomer within the rubber cement by using a catalytically effective amount of the foregoing chromium-based catalyst composition. To understand what is meant by a catalytically effective amount, it should be understood that the total catalyst concentration to be employed in the polymerization mass depends on the interplay of various factors such as the purity of the ingredients, the polymerization temperature, the polymerization rate and conversion desired, and many other factors. Accordingly, a specific total catalyst concentration cannot be definitively set forth except to say that catalytically effective amounts of the respective catalyst ingredients should be used. Generally, the amount of the chromium-containing compound used can be varied from about 0.01 to about 2 mmol per 100 g of 1,3-butadiene monomer, more preferably from about 0.02 to about 1.0 mmol per 100 g of 1,3-butadiene monomer, and even more preferably from about 0.05 to about 0.5 mmol per 100 g of 1,3-butadiene monomer.

In performing the polymerization of 1,3-butadiene into syndiotactic 1,2-polybutadiene within the rubber cement, a molecular weight regulator may be employed to control the molecular weight of the syndiotactic 1,2-polybutadiene to be produced. As a result, the scope of the polymerization system can be expanded in such a manner that it can be used for the production of syndiotactic 1,2-polybutadiene having a wide range of molecular weights. Suitable types of molecular weight regulators that can be utilized include, but are not limited to, β-olefins such as ethylene, propylene, 1-butene, 1-pentene, 1-hexene, 1-heptene, and 1-octene; accumulated diolefins such as alkene and 1,2-butadiene; nonconjugated diolefins such as 1,6-octadiene, 5-methyl-1, 4-hexadiene, 1,5-cyclooctadiene, 3,7-dimethyl-1,6-octadiene, 1,4-cylohexadiene, 4-vinylcyclohexene, 1,4-pentadiene, 1,4-hexadiene, 1,5-hexadiene, 1,6-heptadiene, 1,2-divinylcyclohexane, 5-ethylidene-2-norbornene, 5-methylene-2-norbornene, 5-vinyl-2-norbornene, dicyclopentadiene, and 1,2,4-trivinylcyclohexane; acetylenes such as acetylene, methylacetylene and vinylacetylene; and mixtures thereof. The amount of the molecular weight regulator used, expressed in parts per hundred parts by weight of the 1,3-butadiene monomer (phm), is from about 0.01 to about 10 phm, more preferably from about 0.02 to about 2 phm, and even more preferably from about 0.05 to about 1 phm.

The molecular weight of the syndiotactic 1,2-polybutadiene to be produced can also be effectively controlled by conducting the polymerization of 1,3-butadiene monomer in the presence of hydrogen gas. In this case, the partial pressure of hydrogen gas is preferably from about 0.01 to about 50 atmospheres.

The polymerization of 1,3-butadiene into syndiotactic 1,2-polybutadiene within the rubber cement may be carried out as a batch process, a continuous process, or even a semi-continuous process. In the semi-continuous process, 1,3-butadiene monomer is intermittently charged as needed to replace that monomer already polymerized. In any case, the polymerization is desirably conducted under anaerobic conditions by using an inert protective gas such as nitrogen, argon or helium, with moderate to vigorous agitation. The polymerization temperature may vary widely from a low temperature, such as −10° C. or below, to a high temperature such as 100° C. or above, with a preferred temperature range being from about 20° C. to about 90° C. The heat of polymerization may be removed by external cooling, cooling by evaporation of the 1,3-butadiene monomer or the solvent, or a combination of the two methods. Although the polymerization pressure employed may vary widely, a preferred pressure range is from about 1 atmosphere to about 10 atmospheres.

Once a desired conversion is achieved, the polymerization of 1,3-butadiene monomer into syndiotactic 1,2-polybutadiene within the rubber cement can be stopped by adding a polymerization terminator that inactivates the chromium-based catalyst system. Typically, the terminator employed to inactivate the catalyst system is a protic compound, which includes, but is not limited to, an alcohol, a carboxylic acid, an inorganic acid, water, or a combination thereof An antioxidant such as 2,6-di-tert-butyl-4-methylphenol may be added along with, before or after the addition of the terminator. The amount of the antioxidant employed is usually in the range of 0.2% to 1% by weight of the polymer product. When the polymerization reaction has been stopped, the blend of syndiotactic 1,2-polybutadiene and the rubbery elastomer can be recovered from the polymerization mixture by utilizing conventional procedures of desolventizaton and drying. For instance, the blend of syndiotactic 1,2-polybutadiene and the rubbery elastomer may be isolated from the polymerization mixture by coagulation of the polymerization mixture with an alcohol such as methanol, ethanol, or isopropanol, or by steam distillation of the solvent and the unreacted 1,3-butadiene monomer, followed by filtration. The product is then dried to remove residual amounts of solvent and water. The polymer blend produced is a highly dispersed blend of crystalline syndiotactic 1,2-polybutadiene in the rubbery elastomer.

Advantageously, the chromium-based catalyst composition employed in this invention can be manipulated to vary the characteristics of the syndiotactic 1,2polybutadiene in the polymer blend. Namely, the syndiotactic 1,2-polybutadiene in the polymer blend made by the process of this invention can have various melting temperatures, molecular weights, 1,2-linkage contents, and syndiotacticities, all of which are dependent upon the selection of the catalyst ingredients and the ingredient ratios.

The blends of syndiotactic 1,2-polybutadiene and rubbery elastomers produced with the process of this invention have many uses. For example, these blends can be utilized in rubber compositions that are used to manufacture the supporting carcass, innerliner, and tread of tires. The blends of syndiotactic 1,2-polybutadiene and rubbery elastomers are also useful in the manufacture of films and packaging materials and in many molding applications.

In order to demonstrate the practice of the present invention, the following examples have been prepared and tested as described in the Examples disclosed hereinbelow. The examples should not, however, be construed as limiting the scope of the invention. The claims will serve to define the invention.

EXAMPLES

Example 1

In this experiment, a highly dispersed blend of syndiotactic 1,2-polybutadiene and low-vinyl polybutadiene was prepared by polymerizing 1,3-butadiene monomer into syndiotactic 1,2-polybutadiene in the presence of a low-vinyl polybutadiene rubber cement.

The low-vinyl polybutadiene rubber cement was prepared by charging 449 g of hexanes, 911 g of a 1,3-butadiene/hexanes blend containing 22.40% by weight of 1,3-butadiene, and 0.64 mL of 1.60 M n-butyllithium in hexanes to a two-gallon stainless-steel reactor. The polymerization was carried out at 65 ° C. for 6 hours. The catalyst was inactivated by the addition of 1.02 mL of 1.0 M diethylaluminum chloride. The conversion of the 1,3-butadiene monomer to low-vinyl polybutadiene was determined to be essentially 100% by measuring, the weight of the polymer recovered from a small portion of the rubber cement.

After the low-vinyl polybutadiene rubber cement produced above was cooled to room temperature, 1048 g of hexanes and 2126 g of a 1,3-butadiene/hexane blend containing 22.4% by weight of 1,3-butadiene were added to the rubber cement. The polymerization of the 1,3-butadiene monomer into syndiotactic 1,2-polybutadiene was initiated by the addition of 17.5 mL of 1.0 M of dibutylmagnesium in heptane, 32.7 mL of 0.0582 M chromium(III) 2-ethylhexanoate in hexanes, and 35.8 mL of 0.266 M bis(2-ethylhexyl) hydrogen phosphite in hexanes. The polymerization was conducted at 35 ° C. for 4 hours. The polymerization was stopped by the addition of 3 mL of isopropanol diluted with 50 mL of hexanes. The polymerization mixture was added into 10 liters of isopropanol containing 12 g of 2,6-di-tert-butyl-4-methylphenol. The polymer blend of syndiotactic 1,2-polybutadiene and low-vinyl polybutadiene was isolated by filtration and dried to a constant weight under vacuum at 60 ° C. The yield of the polymer blend was 637 g. The conversion of the 1,3-butadiene monomer to the syndiotactic 1,2-polybutadiene was calculated to be 91%. As determined by differential scanning calorimetry (DSC), the polymer blend had a glass transition temperature of −93° C. resulting from the low-vinyl polybutadiene and a melting temperature of 153° C. resulting from the syndiotactic 1,2-polybutadiene.

Example 2

In this experiment, the same procedure of Example 1 was repeated except that the polymerization of the 1,3-butadiene monomer into syndiotactic 1,2-polybutadiene within the low-vinyl polybutadiene rubber cement was initiated by the addition of 21.4 mL of 1.0 M dibutylmagnesium in heptane, 40.9 mL of 0.0582 M chromium(III) 2-ethylhexanoate in hexanes, and 61.7 mL of 0.193 M of 2-oxo-(2H)-5-butyl-5-ethyl-1,3,2-dioxaphosphorinane in cyclohexane. After work-up of the polymerization mixture, a highly dispersed blend of syndiotactic 1,2-polybutadiene and low-vinyl polybutadiene was obtained. The yield of the polymer blend was 618 g. The conversion of the 1,3-butadiene monomer to the syndiotactic 1,2-polybutadiene was calculated to be 87%. As determined by differential scanning calorimetry (DSC), the polymer blend had a glass transition temperature of −93 ° C. resulting from the low-vinyl polybutadiene and a melting temperature of 141 ° C. resulting from the syndiotactic 1,2-polybutadiene.

Example 3

In this experiment, a highly dispersed blend of syndiotactic 1,2-polybutadiene and high cis-1,4-polybutadiene was prepared by polymerizing 1,3-butadiene monomer into syndiotactic 1,2-polybutadiene within a high cis-1,4-polybutadiene rubber cement.

The high cis-1,4-polybutadiene rubber cement was prepared by charging 449 g of hexanes, 911 g of a 1,3-butadiene/hexanes blend containing 22.4% by weight of 1,3-butadiene, 9.0 mL of 0.68 M triisobutylaluminum in hexanes, 0.41mL of 1.0 M diethylaluminum chloride, and 0.39 mL of 0.520 M neodymium(III) neodecanoate in cyclohexane to a two-gallon stainless-steel reactor. The polymerization was carried out at 80 ° C. for 5 hours. The conversion of the 1,3-butadiene monomer to high cis-1,4-polybutadiene was determined to be 96% by measuring the weight of the polymer recovered from a small portion of the rubber cement.

After the high cis-1,4-polybutadiene rubber cement produced above was cooled to room temperature, 1048 g of hexanes and 2126 g of a 1,3-butadiene/hexanes blend containing 22.4% by weight of 1,3-butadiene were added to the rubber cement. The polymerization of the 1,3-butadiene monomer into syndiotactic 1,2-polybutadiene within the rubber cement was initiated by the addition of 17.1 mL of 1.0 M dibutylmagnesium in heptane, 32.7 mL of 0.0582 M chromium(III) 2-ethylhexanoate in hexanes, and 35.8 mL of 0.266 M of bis(2-ethylhexyl) hydrogen phosphite in hexanes. The polymerization was conducted at 35° C. for 4 hours. The polymerization was stopped by the addition of 3 mL of isopropanol diluted with 50 mL of hexanes. The polymerization mixture was added into 10 liters of isopropanol containing 12 g of 2,6-di-tert-butyl-4-methylphenol. The resulting blend of syndiotactic 1,2-polybutadiene and high cis-1,4-polybutadiene was isolated by filtration and dried to a constant weight under vacuum at 60° C. The yield of the polymer blend was 647 g. The conversion of the 1,3-butadiene monomer to the syndiotactic 1,2-polybutadiene was calculated to be 93%. As determined by differential scanning calorimetry (DSC), the polymer blend had a glass transition temperature of −103° C. and a melting temperature of −7° C. resulting from the high cis-1,4-polybutadiene, and a melting temperature of 152° C. resulting from the syndiotactic 1,2-polybutadiene.

Example 4

In this experiment, the same procedure of Example 3 was repeated except that the polymerization of the 1,3-butadiene monomer into syndiotactic 1,2-polybutadiene within the high cis-1,4-polybutadiene rubber cement was initiated by the addition of 21.4 mL of 1.0 M dibutylmagnesium in heptane, 40.9 mL of 0.0582 M chromium(III) 2-ethylhexanoate in hexanes, and 61.7 mL of 0.193 M of 2-oxo-(2H)-5-butyl-5-ethyl-1,3,2-dioxaphosphorinane in cyclohexane. After work-up of the polymerization mixture, a highly dispersed blend of syndiotactic 1,2-polybutadiene and high cis-1,4-polybutadiene was obtained. The yield of the polymer blend was 632 g. The conversion of the 1,3-butadiene monomer to the syndiotactic 1,2-polybutadiene was calculated to be 90%. As determined toy differential scanning calorimetry (DSC), the polymer blend had a glass transition temperature of −104° C. and a melting temperature of −8° C. resulting from the high cis-1,4-polybutadiene, and a melting temperature of 140° C. resulting from the syndiotactic 1,2-polybutadiene.

In Examples 1–4, after the polymer blend cement was removed from the reactor, visual inspection of the interior of the reactor revealed that the reactor was relatively clean with minimal fouling.

Comparative Example 5

In this experiment, the polymerization of 1,3-butadiene monomer into syndiotactic 1,2-polybutadiene was conducted in the absence of a rubber cement. In the procedure used, a two-gallon stainless-steel reactor was charged with 2408 g of hexanes, 2126 g of a 1,3-butadiene/hexanes blend containing 22.4% by weight of 1,3-butadiene, 17.1 mL of 1.0 M dibutylmagnesium in heptane, 32.7 mL of 0.0582 M chromium(III) 2-ethylhexanoate in hexanes, and 35.8 mL of 0.266 M bis(2-ethylhexyl) hydrogen phosphite in hexanes. The polymerization was conducted at 35° C. for 4 hours. The polymerization was stopped by the addition of 3 mL of isopropanol diluted with 50 mL of hexanes. The polymerization mixture was removed from the reactor and added into 10 liters of isopropanol containing 12 g of 2,6-di-tert-butyl-4-methylphenol, visual inspection of the interior of the reactor revealed that severe reactor fouling had occurred. In particular, the blades and shafts of the agitator were covered with large chunks of agglomerated polymer particles, and the reactor wall was coated with a thick polymer film. Due to reactor fouling, the reactor had to be opened to recover the remaining polymer inside the reactor. The total yield of the syndiotactic 1,2-polybutadiene was 461 g (97%). As determined by differential scanning calorimetry (DSC), the polymer had a melting temperature of 153° C.

This comparative experiment shows that reactor fouling can be a serious problem in the synthesis of syndiotactic 1,2-polybutadiene in the absence of a rubber cement. Examples 1–4 show that by utilizing the process of the present invention, the problem of reactor fouling associated with the synthesis of syndiotactic 1,2-polybutadiene can be greatly reduced.

Although the present invention has been described in the above examples with reference to particular means, materials and embodiments, it would be obvious to persons skilled in the art that various changes and modifications may be made, which fall within the scope claimed for the invention as set out in the appended claims. The invention is therefore not limited to the particulars disclosed and extends to all equivalents within the scope of the claims.

What is claimed is:

1. A process for preparing blends of syndiotactic 1,2-polybutadiene and rubbery elastomers, the process comprising the steps of:
   (1) providing a mixture of a rubber cement and 1,3-butadiene monomer; and
   (2) polymerizing the 1,3-butadiene monomer into syndiotactic 1,2-polybutadiene within the rubber cement by using a catalyst composition that is the combination of or the reaction product of ingredients comprising:
      (a) a chromium-containing compound;
      (b) a hydrogen phosphite; and
      (c) an organomagnesium compound.

2. The process of claim 1, where said step of providing the mixture of a rubber cement and 1,3-butadiene monomer comprises the step of preparing a rubber cement by polymerizing one or more monomers in an organic solvent to form rubbery elastomers, and then the step of adding 1,3-butadiene monomer to the rubber cement.

3. The process of claim 1, where said step of providing the mixture of a rubber cement and 1,3-butadiene monomer comprises the step of dissolving one or more preformed rubbery elastomers in an organic solvent, and then the step of adding 1,3-butadiene monomer.

4. The process of claim 1, where the rubbery elastomers are natural rubber, low-vinyl polybutadiene, cis-1,4-polybutadiene, amorphous 1,2-poly-butadiene, low-vinyl polyisoprene, cis-1,4-polyisoprene, polyisobutylene, neoprene, ethylene-propylene copolymer rubber, styrene-butadiene rubber, styrene-isoprene rubber, styrene-isoprene-butadiene rubber, styrene-butadiene-styrene block copolymer, styrene-butadiene block copolymer, hydrogenated styrene-butadiene-styrene block copolymer, hydrogenated styrene-butadiene block copolymer, styrene-isoprene-styrene block copolymer, styrene-isoprene block copolymer, hydrogenated styrene-isoprene-styrene block copolymer, hydrogenated styrene-isoprene block copolymer, polysulfide rubber, acrylic rubber, urethane rubber, silicone rubber, epichlorohydrin rubber, or mixtures thereof.

5. The process of claim 2, where the organic solvent is n-pentane, n-hexane, n-heptane, n-octane, n-nonane, n-decane, isopentane, isohexanes, isoheptanes, isooctanes, 2,2-dimethylbutane, petroleum ether, kerosene, petroleum spirits, cyclopentane, cyclohexane, methylcyclopentane, methylcyclohexane, benzene, toluene, xylenes, ethylbenzene, diethylbenzene, mesitylene, or a mixture thereof.

6. The process of claim 3, where the organic solvent is n-pentane, n-hexane, n-heptane, n-octane, n-nonane, n-decane, isopentane, isohexanes, isoheptanes, isooctanes, 2,2-dimethylbutane, petroleum ether, kerosene, petroleum spirits, cyclopentane, cyclohexane, methylcyclopentane, methylcyclohexane, benzene, toluene, xylenes, ethylbenzene, diethylbenzene, mesitylene, or a mixture thereof.

7. The process of claim 1, where the concentration of the rubbery elastomers within the rubber cement is from about 5% to about 35% by weight of the rubber cement.

8. The process of claim 1, where said step of polymerizing 1,3-butadiene monomer into syndiotactic 1,2-polybutadiene is conducted in the presence of about 0.01 to about 10 mmol of the chromium-containing compound per 100 g of 1,3-butadiene.

9. The process of claim 1, where the chromium atom in the chromium-containing compound has an oxidation state of from 0 to +6.

10. The process of claim 1, where chromium-containing compound is a chromium carboxylate, chromium organophosphate, chromium organophosphonate, chromium organophosphonate, chromium carbamate, chromium dithiocarbamate, chromium xanthate, chromium β-diketonate, chromium alkoxide, chromium aryloxide, chromium halide, chromium pseudo-halide, chromium oxyhalide, organochromium compound, or a mixture thereof.

11. The process of claim 1, where the hydrogen phosphite is an acyclic hydrogen, phosphite defined by the following keto-enol tautomeric structures:

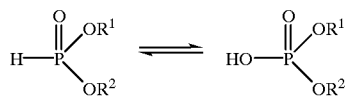

or a cyclic hydrogen phosphite defined by the following keto-enol tautomeric structures:

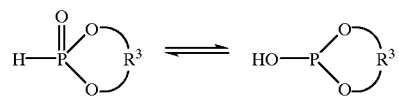

or a mixture thereof, where $R^1$ and $R^2$, which may be the same or different, are mono-valent organic groups, and where $R^3$ is a divalent organic group.

12. The process of claim 11, where $R^1$ and $R^2$ are alkyl, cycloalkyl, substituted cycloalkyl, alkenyl, cycloalkenyl, substituted cycloalkenyl, aryl, allyl, substituted aryl, aralkyl, alkaryl, or alkynyl groups, with each group containing up to about 20 carbon atoms, and where $R^3$ is an alkylene, cycloalkylene, substituted alkylene, substituted cycloalkylene, alkenylene, cycloalkenylene, substituted alkenylene, substituted cycloalkenylene, arylene, or substituted arylene group, with each group containing up to about 20 carbon atoms.

13. The process of claim 1, where the organomagnesium compound is represented by the general formula $MgR^4_2$, where each $R^4$, which may be the same or different, is a mono-valent organic group.

14. The process of claim 13, where each $R^4$ is an alkyl, cycloalkyl, substituted cycloalkyl, alkenyl, cycloalkenyl, substituted cycloalkenyl, aryl, allyl, substituted aryl, aralkyl, alkaryl, or alkynyl group, with each group containing up to about 20 carbon atoms.

15. The process of claim 1, where the organomagnesium compound is represented the general formula $R^5MgX$, where $R^5$ is a mono-valent organic group, and X is a hydrogen atom, a halogen atom, a carboxylate group, an alkoxide group, or an aryloxide group.

16. The process of claim 15, where $R^5$ is an alkyl, cycloalkyl, substituted cycloalkyl, alkenyl, cycloalkenyl, substituted cycloalkenyl, aryl, allyl, substituted aryl, aralkyl, alkaryl, or alkynyl group, and each group contains up to about 20 carbon atoms.

17. The process of claim 1, where the organomagnesium compound its a dihydrocarbylmagnesium or a hydrocarbylmagnesium halide.

18. The process of claim 1, where the molar ratio of the hydrogen phosphite to the chromium-containing compound is from about 0.5:1 to about 50:1, and the molar ratio of the organomagnesium compound to the chromium-containing compound is from about 1:1 to about 50:1.

19. A process for producing blends of syndiotactic 1,2-polybutadiene and rubbery elastomers, the process comprising the steps of:

(1) providing a mixture of a rubber cement and 1,3-butadiene monomer; and (2) polymerizing the 1,3-butadiene monomer into syndiotactic 1,2-polybutadiene within the rubber cement by using a catalyst composition that is formed by combining:
   (a) a chromium-containing compound;
   (b) a hydrogen phosphite; and
   (c) an organomagnesium compound.

20. A blend of syndiotactic 1,2-polybutadiene and rubbery elastomers prepared by a process comprising the steps of:

(1) providing a mixture of a rubber cement and 1,3-butadiene monomer; and (2) polymerizing the 1,3-butadiene monomer into syndiotactic 1,2-polybutadiene within the rubber cement by using a catalyst composition that is the combination of or the reaction product of ingredients comprising:
   (a) a chromium-containing compound;
   (b) a hydrogen phosphite; and
   (c) an organomagnesium compound.

* * * * *